United States Patent [19]

Chen

[11] Patent Number: 5,180,114

[45] Date of Patent: Jan. 19, 1993

[54] PEPPER GRINDER

[76] Inventor: Tzung-Wen Chen, No. 13, Yen-Ping St., Tainan, Taiwan

[21] Appl. No.: 852,405

[22] Filed: Mar. 16, 1992

[51] Int. Cl.$^5$ ............................................. A47J 42/04
[52] U.S. Cl. ................................................... 241/169.1
[58] Field of Search ............................ 241/168, 169.1

[56] References Cited

U.S. PATENT DOCUMENTS

| 3,168,256 | 2/1965 | Bounds et al. | 241/169.1 |
| 4,374,574 | 2/1983 | Daird | 241/169.1 |
| 4,509,698 | 4/1985 | Daird | 241/169.1 |
| 4,685,625 | 8/1987 | Mazza | 241/169.1 X |
| 4,685,627 | 8/1987 | Lee | 241/169.1 |
| 4,844,352 | 7/1989 | Griffin | 241/169.1 X |
| 4,925,150 | 5/1990 | Tedioli | 241/169.1 |
| 5,082,190 | 1/1992 | Chen | 241/169.1 |
| 5,088,652 | 2/1992 | Chen | 241/169.1 |

FOREIGN PATENT DOCUMENTS

| 278234 | 8/1988 | European Pat. Off. | 241/169.1 |
| 2499840 | 8/1982 | France | 241/169.1 |

Primary Examiner—Mark Rosenbaum
Assistant Examiner—Frances Chin

[57] ABSTRACT

A pepper grinder has a rotating cap, a body, a turning rod extending through the cap and the body, a grinding unit secured by a base, and a gear unit to rotate the turning rod to rotate a grinding wheel in the grinding unit when the rotatable cap is rotated manually clockwise. But counterclockwise rotating of the cap cannot rotate the turning rod to rotate the grinding wheel to prevent counterclockwise rotation of the grinding wheel.

8 Claims, 8 Drawing Sheets

PEPPER GRINDER

BACKGROUND OF THE INVENTION

A conventional pepper grinder can also be rotated counterclockwise, and its counterclockwise rotation can cause grinding teeth in a grinding wheel and a grinding cylinder to harm each other, and if worse, a small bit of metal tooth broken down from them can mix with ground pepper to go into food.

One more disadvantage that a conventional pepper grinder has is that clockwise manual rotation of a rotatable cap has to be repeated in grinding pepper, so a user has to move his hand repeatedly and rotate the cap to a largest angle and then release his hand to grip the cap again.

SUMMARY OF THE INVENTION

This pepper grinder in the present invention has been improved to have the following advantages.
 1. It can never rotate counterclockwise.
 2. It can be very clean and healthy, without any probability of breaking small bits of metal teeth from a grinding wheel to mix with ground pepper.
 3. It can rotate clockwise to grind pepper but also can rotate counterclockwise without grinding pepper, saving manual force in rotating the rotatable cap.

One feature of the present invention is that a rod gear (the first gear) is provided to be fixed on a turning rod, and an unrotatable stationary gear (the third gear) engages a movable unrotatable gear (the second gear) and moves together around to rotate the first gear, which in order rotates the turning rod together at the same time. But when the rotatable cap rotates counterclockwise, both the second and the third gear cannot move forward, impossible to rotate the first gear so that the turning rod can never be rotated counterclockwise.

Another feature is that the movable unrotatable gear (the second gear) does not have enough force to rotate the rod gear (the first gear) when the rotatable cap rotates counterclockwise, because the second gear is fitted in two corresponding recesses in an intermediate horizontal wall and a bottom wall of a position cylinder, parallel to the first gear, and a compress spring pushing the second gear in the gear recess in the position cylinder does not have elastic force enough to push the second gear to engage the first gear.

Another feature is that the rotatable cap and the position cylinder have a central hole for the turning rod to pass loosely through so that rotation of the rotatable cap together with the position cylinder cannot directly rotate the turning rod.

Another feature is that a ratchet wheel is firmly fixed on the turning rod, and a pawl formed with the position cylinder extending from its inner wall can push to rotate the ratchet wheel, which then in order rotates the turning rod when the rotatable cap rotates clockwise. But when the rotatable cap rotates counterclockwise, the ratchet wheel cannot be rotated by the pawl.

Another feature is that the ratchet wheel has a dodecagonal (quadrangle or octagonal) central hole for the turning rod to pass through for fast combination of both the components.

Another feature is that a flat disc gear is firmly fixed on the turning rod, and an actuating disc having two curved down pawls is provided above the disc gear to push teeth on the disc gear, which is then rotated to rotate the turning rod at the same time. So when the rotatable cap rotates clockwise, the actuating disc is rotated, with the pawls pushing the disc gear to rotate. But when the rotatable cap rotates counterclockwise, the pawls slide up and down on the teeth on the disc gear, impossible to rotate the disc gear.

Another feature is that when the rotatable cap is rotated counterclockwise, some unground pepper may remain in the grinding unit to resist counterclockwise rotation of the turning rod.

One more feature is that the actuating disc is fixed firmly around the inner wall of the turning cap to enable the actuating disc to rotate together with the rotatable cap to rotate or not to rotate the turning rod.

DETAILED DESCRIPTION OF THE INVENTION

The first embodiment of the pepper grinder in the present invention, as shown in FIGS. 1–4, comprises a body 2, a rotatable cap 1, a gear unit, a grinding unit 7, and a base 8 as its main components.

Figure 1:
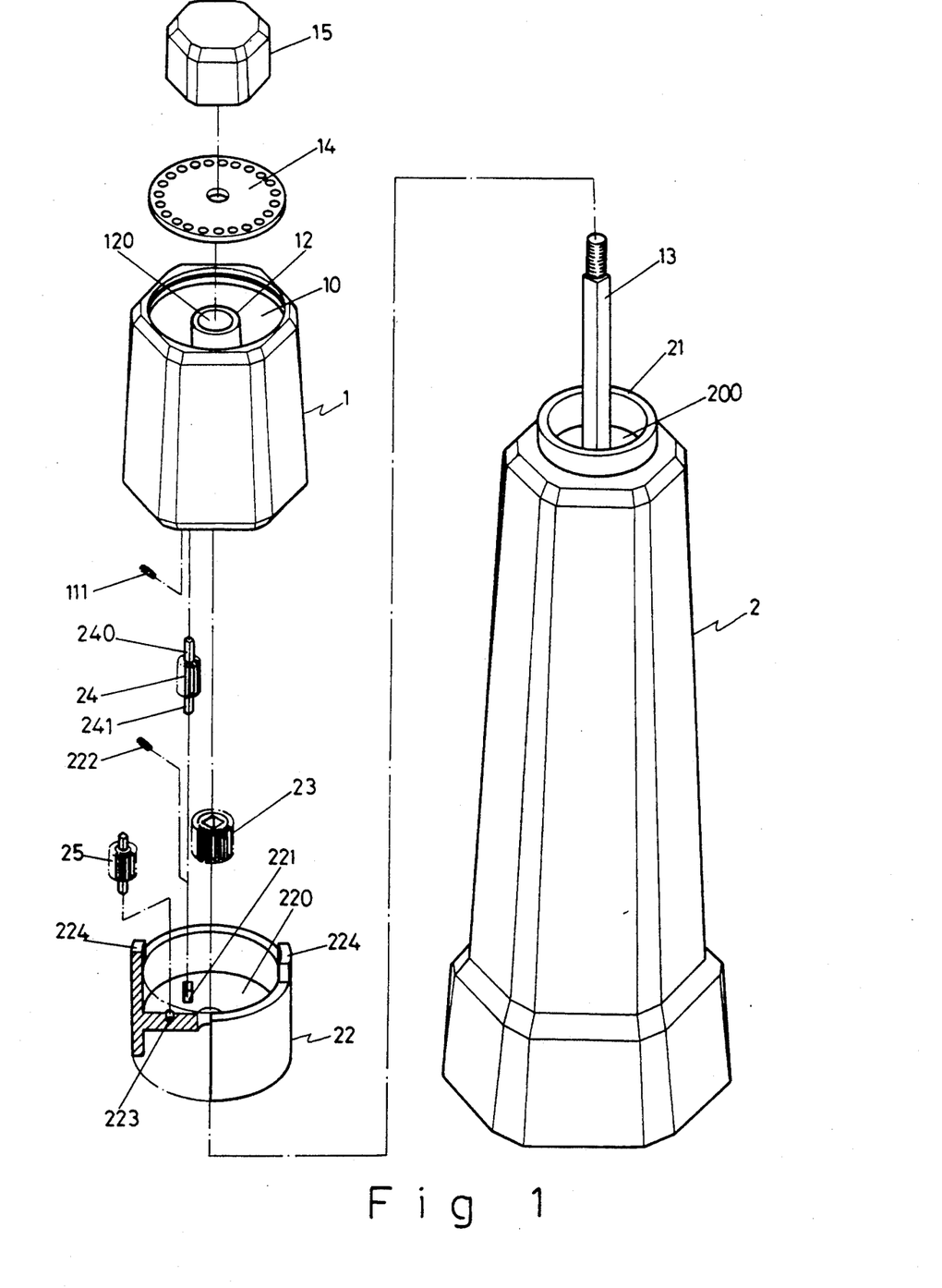
FIG. 1 is a partial exploded perspective view of the first embodiment of the pepper grinder in the present invention.
Figure 2:
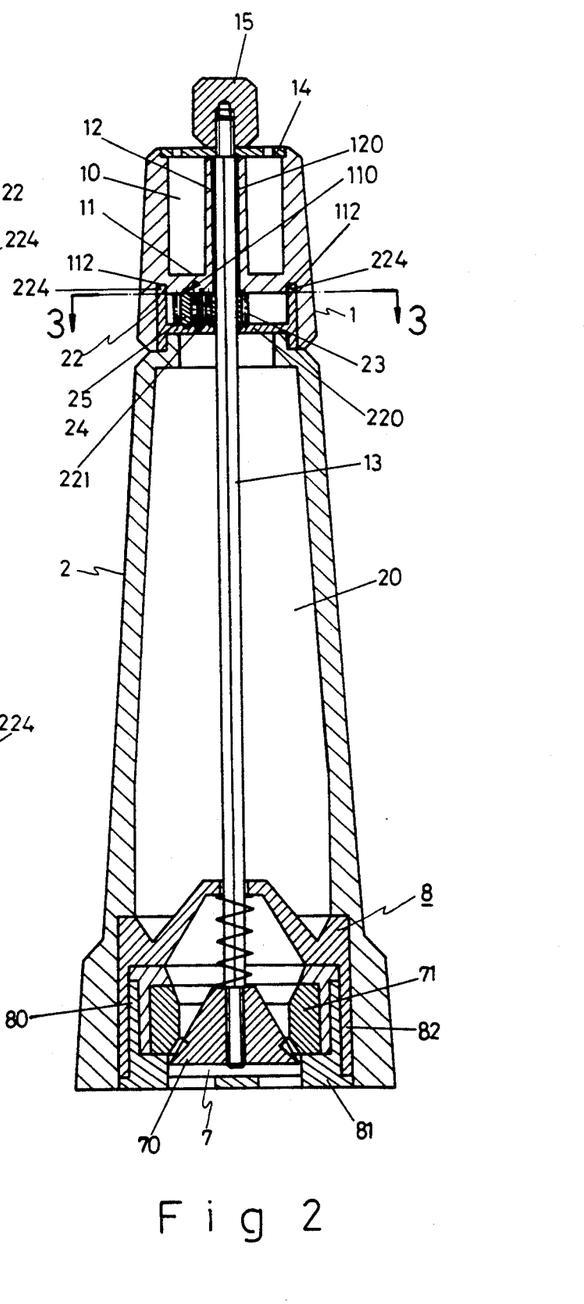
FIG. 2 is a cross-sectional view of the first embodiment of the pepper grinder in the present invention.

The rotatable cap 1 has a salt chamber 10 to store salt therein, a salt sprinkling lid 14, a screw button 15 screwing with the top of the turning rod 13, an intermediate horizontal wall 11 and a hollow post 12 extending upright in the center for a turning rod 13 to pass through its hole 120. The turning rod 13 is a little loosely extending in the hole 120 and can be rotated by the rotatable cap 1. The salt sprinkling lid 14 does not rotate with the rotatable cap 1. The button 15 can be screwed loose or tight on the top end of the turning rod 13 to adjust the height of a grinding wheel 70 so as to adjust minuteness of pepper to be ground. A movable gear recess 110 is provided under the intermediate wall 11, and a compress spring 111 and the square upper shaft 240 of a movable unrotatable gear 24 are laid therein. An immovable gear shaft hole is also provided under the intermediate wall 11 to correspond to an immovable gear shaft hole 223 in the bottom wall of the position cylinder 22, and two mortises 112 are also provided under the intermediate wall for two tenons 224 in a position cylinder 22 to fit therein.

The body 2 has a pepper chamber 20, an opening 200, a circular low wall 21 around the opening 200 to be fitted around its outer surface by the position cylinder 22, which is then rotatable with the rotatable cap 1.

The gear unit consisting of a rod gear 23 fitting around the turning rod 13, a movable unrotatable gear 24 and an immovable unrotatable gear 25 are combined to engage with each other and placed in the position cylinder 22 on a bottom wall 220 so that the gear unit is completely separated from the pepper chamber 20, preventing the gear unit from being stuck dead by pepper. The bottom wall 220 is provided with a movable gear groove 221 for the movable unrotatable gear 24 having a square shaft 241 and a compress spring 222 to fit therein, and with an immovable gear shaft hole 223 for the immovable unrotatable gear 25 to fit therein.

The position cylinder 22 has two opposite tenons 224 on the top to engage two mortises 112 in the rotatable cap 1 to enable the position cylinder 22 to be rotated by the cap 1.

Figure 3:
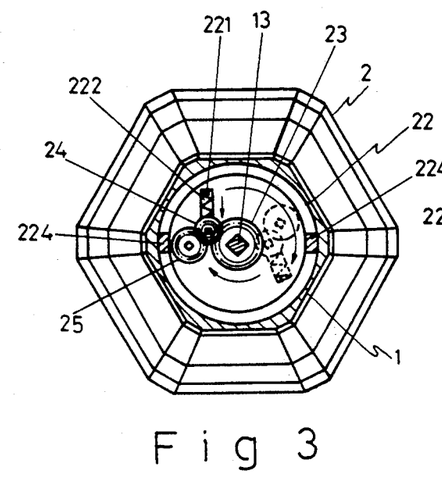
FIG. 3 is a cross-sectional view of line 3—3 in FIG. 2, wherein the grinder is rotated clockwise to make a turning rod rotate for grinding.
Figure 4:
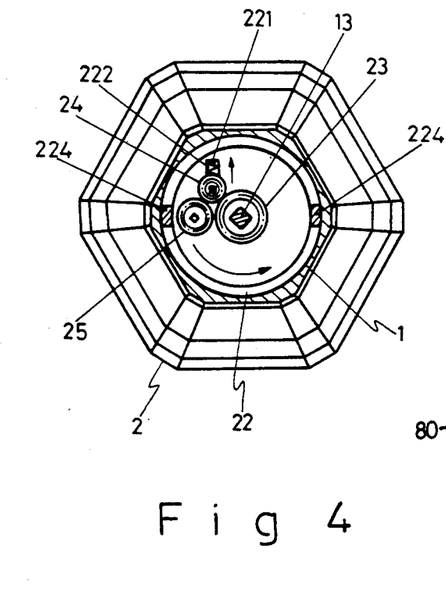
FIG. 4 is a cross-sectional view of line 3—3 in FIG. 2, wherein the grinder is rotated counterclockwise to make the turning rod impossible to rotate for grinding.

The rod gear 23 (the first gear) is fixed on the turnable rod 13 and can engage the movable unrotatable gear 24, which then engages the immovable unrotatable gear 25, which is placed between the intermediate wall 11 and the bottom wall 220 in the position cylinder 22. Therefore, when the rotatable cap 1 is rotated manually clockwise, it can rotate the position cylinder 22, which then forces the immovable unrotatable gear 25 to push forward the movable unrotatable gear 24 as shown in FIG. 3. And the gear 24 can move to rotate the rod gear 23, which then rotates the turning rod 13 to grind pepper. On the contrary, when the rotatable cap 1 is rotated manually counterclockwise, the unrotatable gear 25 cannot push the movable gear 24 and the compress spring 111 has not enough elasticity to push the movable unrotatable gear 24 to engage the rod gear (the first gear) so that the turning rod 13 cannot rotate the grinding wheel 70.

The second embodiment of the pepper grinder in the present invention, as shown in FIGS. 5-9, comprises a rotatable cap 3, a body 4, a grinding unit 7, and a base 8 the same as the those in the first embodiment but has a different gear unit.

Figure 5:
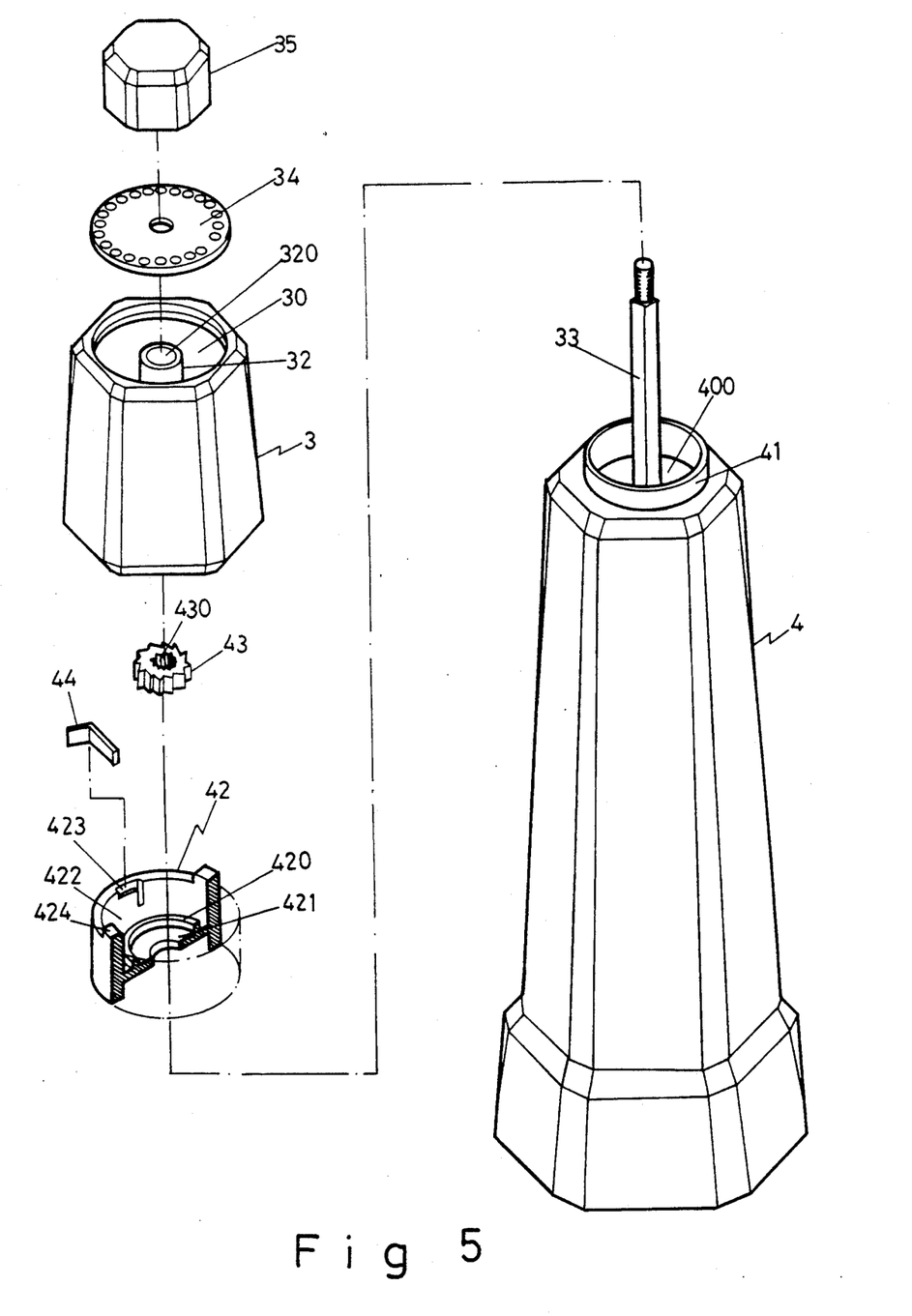
FIG. 5 is a partial exploded perspective view of the second embodiment of the pepper grinder in the present invention.
Figures 6, 7, 8, 9:
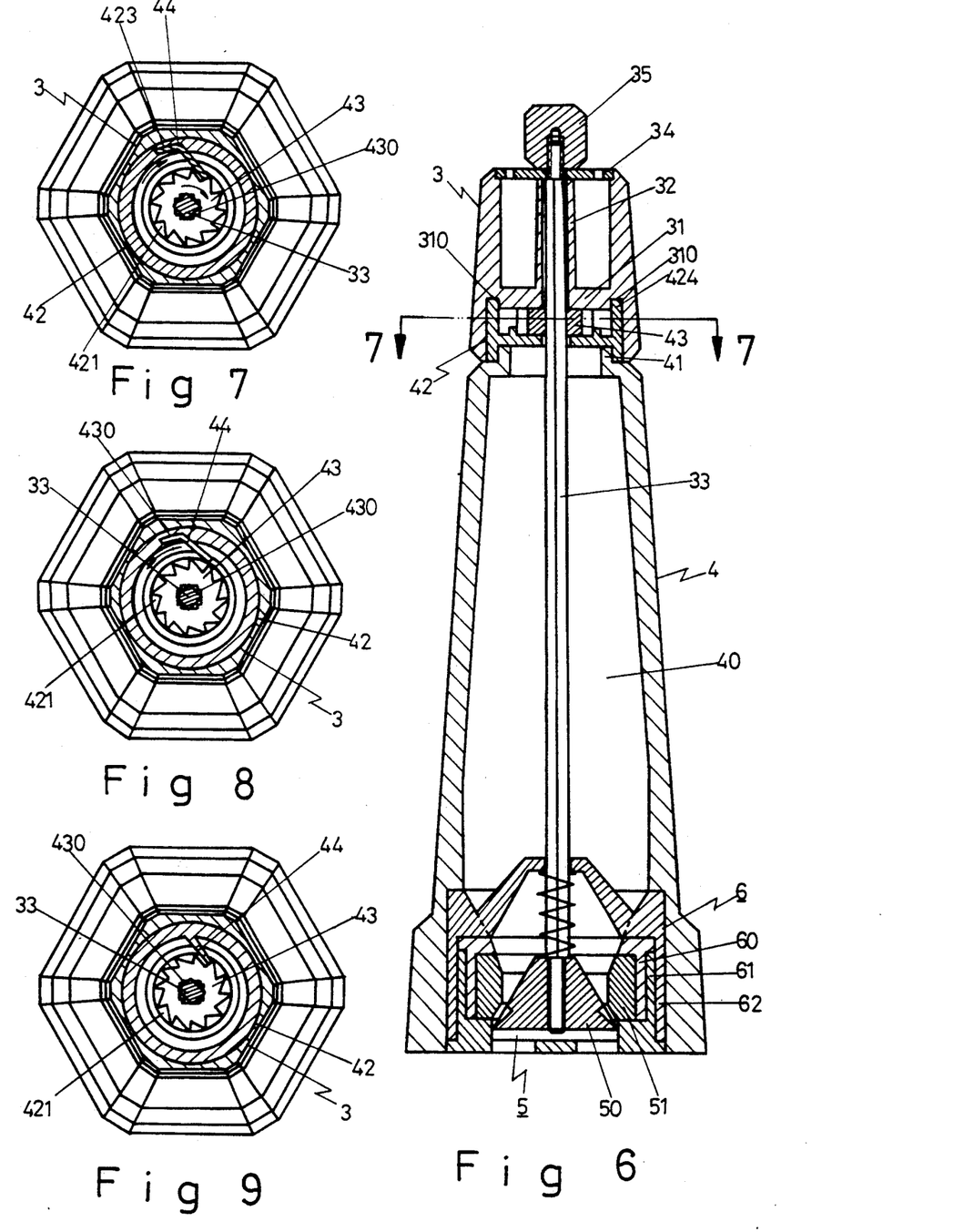
FIG. 6 is a cross-sectional view of the second embodiment of the pepper grinder in the present invention.
FIG. 7 is a cross-sectional view of line 7—7 in FIG. 6, wherein the grinder can be rotated clockwise to make the turning rod rotate for grinding.
FIG. 8 is a cross-sectional view of line 7—7 in FIG. 6, wherein if the grinder is rotated counterclockwise, the turning rod cannot rotate.
FIG. 9 is a cross-sectional view of the pawl and the position cylinder formed as one unit in the pepper grinder in the present invention.

The rotatable cap 3 has a salt chamber 30, a horizontal intermediate wall 31, two mortises 310, 310, in the under surface pg the wall 31 for two tenons 424, 424 to engage therein, a vertical; hollow middle post 32 for a turning rod 33 to extend upward through an opening 320. The hollow interior in the post 32 has a little longer diameter than that of the turning rod to prevent the rotatable cap 3 from directly rotating the turning rod 33. A salt sprinkling lid 34 is provided to cover the top opening of the salt chamber 30. A screw button 35 screws with the top end of the turning rod 33 and loose or right screwing of the screw button 35 with the turning rod 33 can adjust the height of a grinding wheel 50 for adjusting minuteness of pepper to be ground.

The body 4 has a pepper chamber 40, an opening 400, a circular low wall 41 around the opening 400 being fitted around on its outer surface by a position cylinder 42, which can rotate around the circular wall 41.

The position cylinder 42 has a bottom wall 420 for separating the gear unit from the pepper chamber 40. The gear unit consists of a rachet wheel 43 and a pawl 44. The bottom wall 420 has a rachet wheel recess 421 for placing therein the ratchet wheel 43, which has a dodecagonal hole 430 for the turning rod 33 to pass through and to move together with the ratchet wheel 43. The position cylinder 42 also has two opposite tenons 424, 424 on the top to engage the mortises 310, 310 so as to enable the cylinder 42 to be rotated by the rotatable cap 3. A pawl groove 423 is provided in the inner side wall 422 of the cylinder 42 for the pawl 44 to fit therein and obliquely extending to the ratchet wheel 43 as shown in FIGS. 5, 7 and 8. The pawl 44 can also be formed with the inner wall 422 as one unit as shown in FIG. 9. Then when the rotatable cap 3 is rotated clockwise manually, the Pawl 44 can push the ratchet wheel 43 to grind pepper. If the rotatable cap 3 is rotated counterclockwise manually, the pawl 44 can never push to rotate the ratchet wheel 43 as shown in FIG. 8, preventing the grinding wheel 50 from rotating counterclockwise.

FIGS. 10-16 show the third embodiment of the pepper grinder in the present invention, which comprises a rotatable cap 5, a body 6, a grinding unit 7, a base 8 the same as the first embodiment but a different gear unit.

Figures 11, 12, 13:
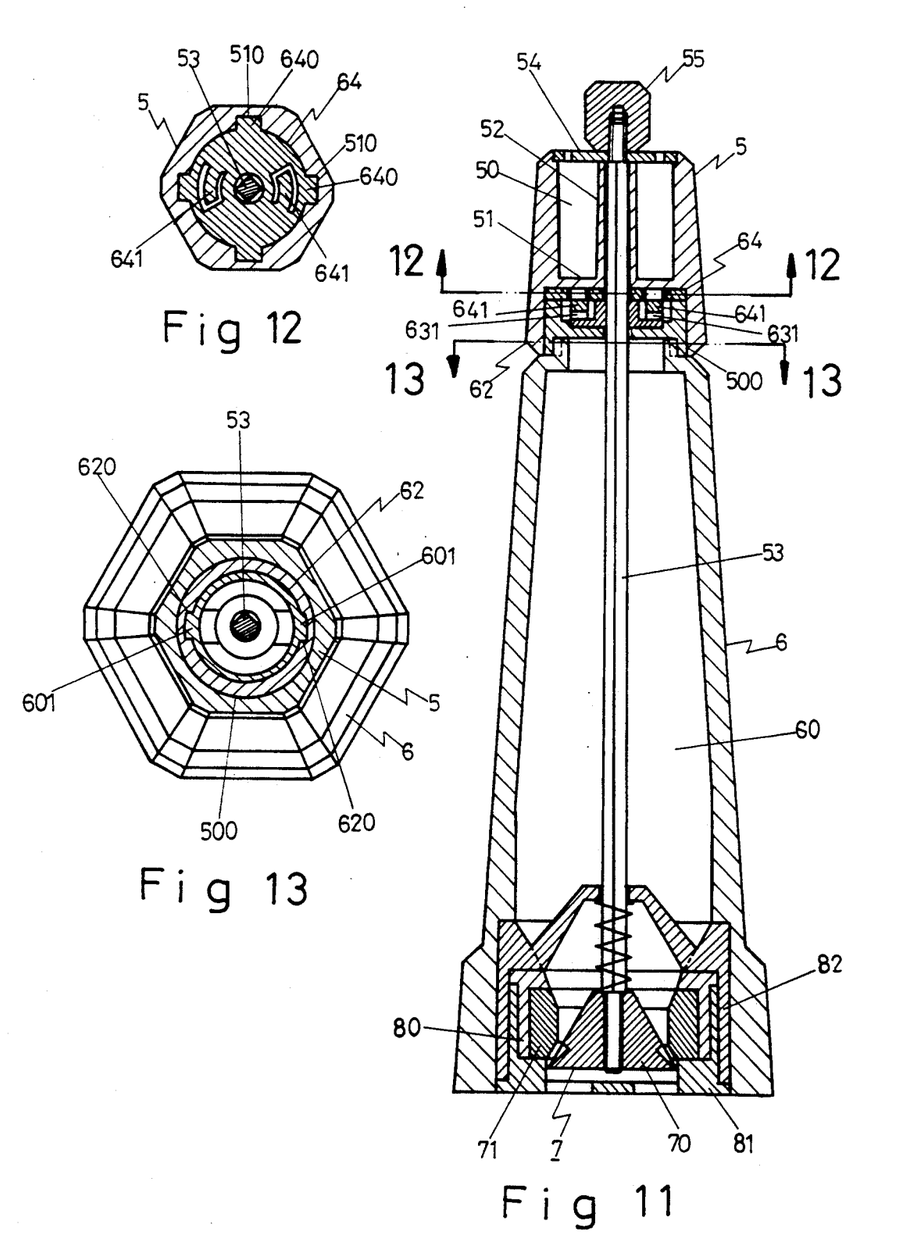
FIG. 11 is a cross-sectional view of the third embodiment of the pepper grinder in the present invention.
FIG. 12 is a cross-sectional view of line 12—12 in FIG. 11.
FIG. 13 is a cross-sectional view of line 13—13 in FIG. 11.
Figure 14:
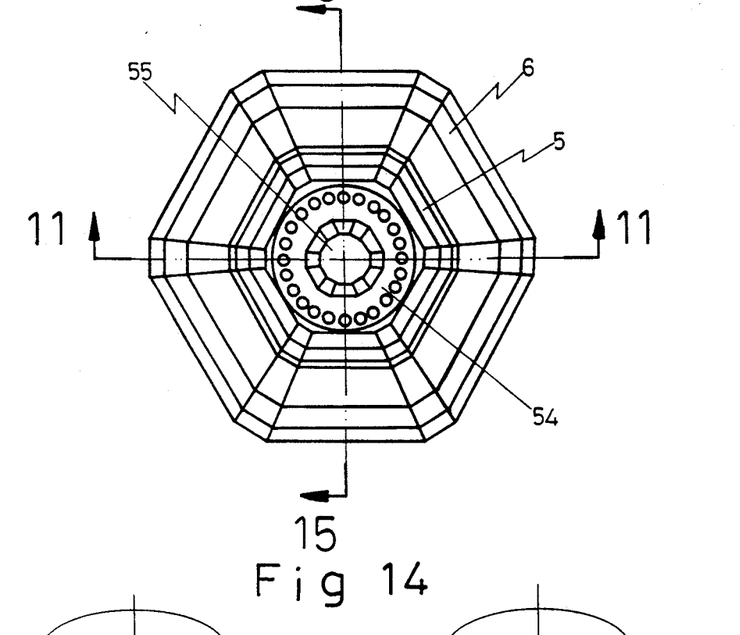
FIG. 14 is a upside view of the third embodiment of the pepper grinder in the present invention.
Figure 15:
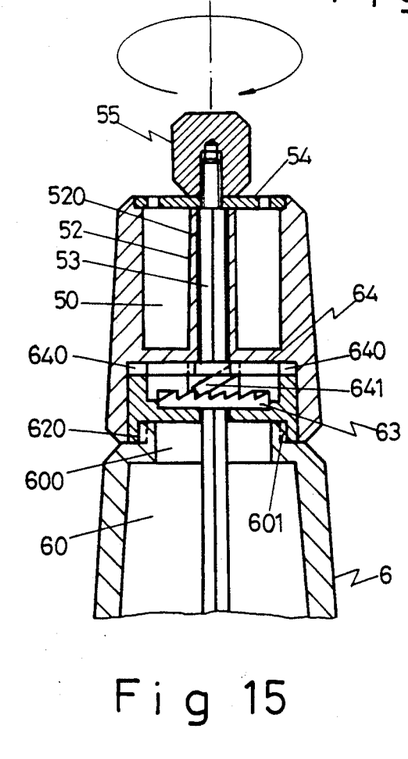
FIG. 15 is a cross-sectional view of line 15—15 in FIG. 14, wherein the turning rod can rotate.
Figure 16:
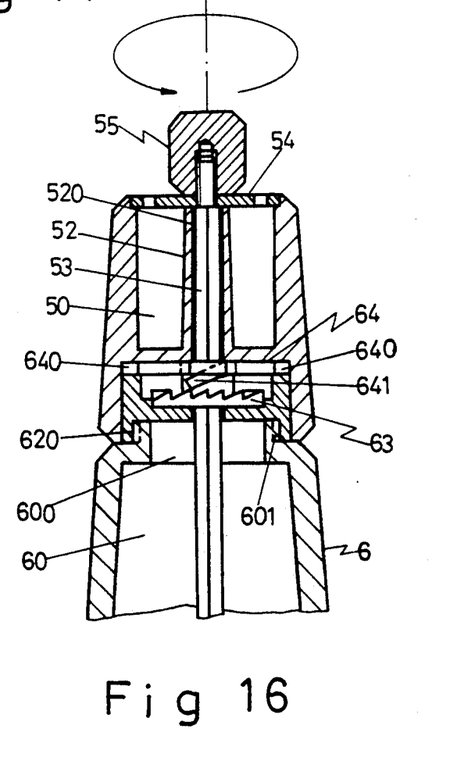
FIG. 16 is a cross-sectional view of line 15—15 in FIG. 14, wherein the turning rod cannot rotate.
Figure 17:
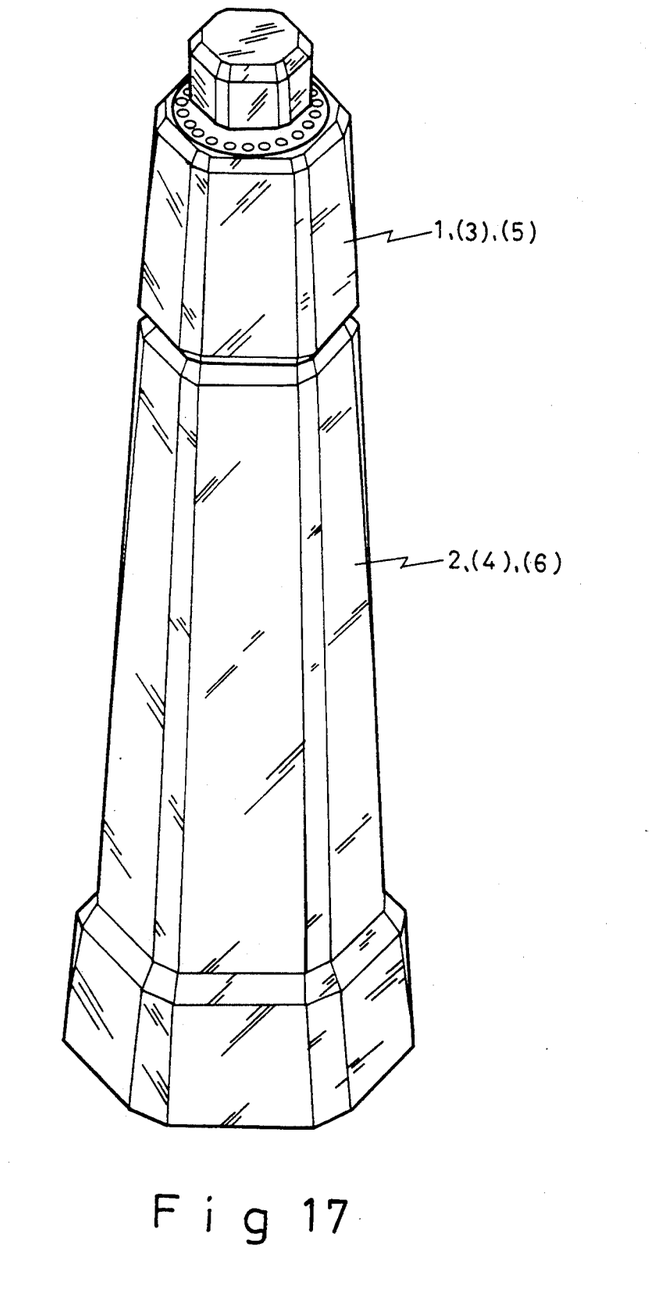
FIG. 17 is perspective view of the pepper grinder in the present invention.

The turning cap 5 has a salt chamber 50, a horizontal intermediate wall 51 to separate the chamber 50 from other components installed under the wall 51. A circular wall 500 is provided to extend downward from the wall 51, having four mortises 510 for four tenons 641 in an actuating disc 64 to engage therein to secure the disc 64 with the rotatable cap 5 as shown in FIGS. 12, 15 and 16. A vertical hollow post 52 is provided in the cap 5 for the turning rod 53 to extend upward through an opening 520. The diameter of the hollow interior of the post 52 is a little larger than that of the turning rod 53 so that the cap 5 can not directly rotate the rod 53. A salt sprinkling lid 54 is covered on the upper opening of the cap 5, and a screw button 55 screws with the top end of the turning rod 53 to adjust the height of the grinding wheel 70 in the same way as in the first and the second embodiment.

Figure 10:
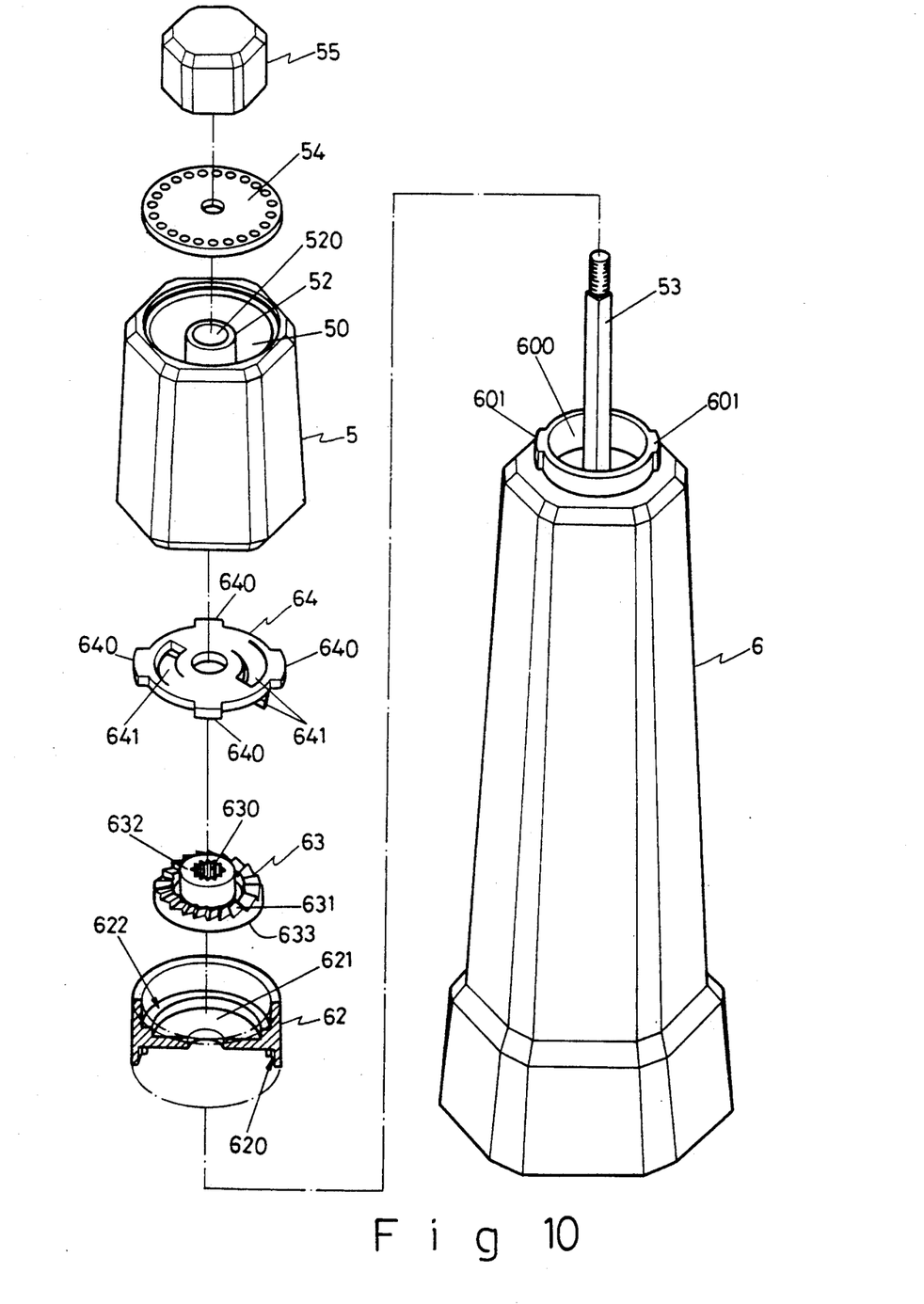
FIG. 10 is a partial exploded perspective view of the third embodiment of the pepper grinder in the present invention.

The body 6 has a pepper chamber 60, an opening 600 defined by a circular low wall, which is fitted around at its outer surface by the position cylinder 62, and as two opposite tenons 601, 601 to fit in two mortises 620, 620 in the cylinder 62 so as to secure the cylinder 62 with the body 6.

The position cylinder 62 has a bottom wall 621 to separate rotating components from pepper chamber 60 to prevent the rotating components from being stuck dead by pepper, and the bottom wall 621 defines a gear chamber 622 for the flat gear 63 to be fitted therein horizontally with a flat lateral side lying on the bottom wall 621. A flat gear 63 has a shaft 632, and the shaft 632 bored with a dodecagonal rod hole 630 for the turning rod 53 to fit through and a teeth surface 631 provided with a plurality of right angle gear teeth for two pawls 641 in the actuating disc 64 to push, having a flat lower lateral side 632 to lie in the gear chamfer 622.

The actuating disc 64 is fixed firmly in the cap 5 on the gear 63, having two pawls 641, 641 gradually curving down. The pawls 641, 641 push and move the teeth of the gear 63, rotating the gear 63 clockwise when the cap 5 is to rotate clockwise the turning rod 53 and then grinding wheel 70, which then grinds pepper. But if the actuating disc 64 is rotated counterclockwise by counterclockwise rotation of the cap 5 as shown in FIG. 16, the pawls 641, 641 slide up and down on the teeth surface 631, impossible to push to move the gear 63. Then the turning rod 53 does not rotate to move the grinding wheel 70, preventing the grinding wheel 70 and a grinding cylinder 71 from wearing caused by mutual counterclockwise friction.

A grinding unit 7 applicable for all the three embodiments of the pepper grinder consists of a grinding wheel 70 and a grinding cylinder 71.

A base 8 applicable for all the three embodiments of the pepper grinder consists of an inner, an intermediate and an outer layer 80, 81, 82 fitting with one another to secure firmly the grinding cylinder 71 to be located around the grinding wheel 70 with a cap.

What is claimed is:

1. A pepper grinder comprising:
   a rotatable cap having a salt sprinkling lid covering an upper opening of a salt chamber;
   a body having a pepper chamber, a circular lower wall around the opening;
   a turning rod extending through the interior of said rotating cap and said body;
   a gear unit having a rod gear fixed to the turning rod, said rotatable cap having two mortises and a vertical hollow middle post in the salt chamber for the turning rod to extend upwardly through the opening, a screw button screwed to the top end of the turning rod, a horizontal intermediate wall to separate that salt chamber from the gear unit;
   a position cylinder having a bottom wall, two opposite tenons on its top to engage said mortises in said rotating cap, said position cylinder fits around the circular lower wall of said body;
   a base having inner, intermediate, and outer layer;
   a grinding unit having a grinding wheel fixed to the lower end of the turning rod and a grinding cylinder secured to the outer layer of said base which surrounds the grinding wheel;
   a first gear having a square upper shaft to fit within a moving gear recess via a first compression spring in the intermediate wall and to fit within a moving gear groove via a second compression spring in the bottom wall of said position cylinder;
   said moving gear recess being parallel to the turning rod;
   said first gear moves but does not rotate within said moving gear recess and said moving gear groove;
   said first gear engaged with the rod gear and a second gear;
   said rotatable cap moves said second gear when rotated in a clockwise manner, said second gear then engages and rotates the first gear which rotates the rod gear and turning rod, therefore, said turning rod rotates in a clockwise manner to grind pepper;
   said rotatable cap does not move said second gear when rotated in a counterclockwise manner, whereby said second gear does not engage said first gear to rotate said rod gear and said turning rod.

2. The pepper grinder as claimed in claim 1, wherein said turning rod is loosely connected to said rotatable cap and said position cylinder so that said rotatable cap does not directly rotate said turning rod.

3. A pepper grinder comprising:
   a rotatable cap having a salt sprinkling lid covering an upper opening of a salt chamber;
   a body having a pepper chamber, a circular vertical lower wall around the opening;
   a turning rod having a ratchet wheel which passes through a multi-sided central hole in the ratchet wheel;
   said rotatable cap having a vertical hollow middle post having a larger diameter in the salt chamber for the turning rod with a smaller diameter to extend upwardly through the opening, a screw button screwed to the top end of the turning rod;
   a position cylinder having a pawl connected to an inner wall, said position cylinder fits around the circular vertical lower wall of said body;
   a base having inner, intermediate, and outer layers;
   a grinding unit having a grinding wheel and a grinding cylinder;
   said rotatable cap moves said position cylinder when rotated in a clockwise manner, said pawl then engages and rotates the ratchet wheel which rotates said grinding wheel to grind pepper;
   said rotatable cap does not move said pawl when rotated in a counterclockwise manner, whereby said ratchet wheel does not engage said grinding unit.

4. The pepper grinder as claimed in claim 3, wherein said pawl being connected to said position cylinder to form one unit.

5. The pepper grinder as claimed in claim 3, wherein said multi-sided central hole is dodecagonal.

6. The pepper grinder as claimed in claim 3, wherein said multi-sided central hole is a quadrangle.

7. A pepper grinder comprising:
   a rotatable cap having a salt sprinkling lid covering an upper opening of a salt chamber;
   a body having a pepper chamber, a circular lower wall around the opening;
   a turning rod extending through the interior of said rotating cap and said body;
   a position cylinder having a bottom wall and a gear recess in a central portion of the bottom wall, said position cylinder fits around the circular lower wall of said body;
   a grinding unit having a grinding wheel and a grinding cylinder;
   a base having inner, intermediate, and outer layers;
   an actuating disc having at least one pawl gradually extending downwardly to push teeth on a lateral side of a flat gear which is disposed horizontally in a gear chamber on the bottom wall of the position cylinder;
   said rotatable cap having a vertical hollow middle post having a larger diameter in the salt chamber for the turning rod with a smaller diameter to extend upwardly through the opening, a screw button screwed to the top end of the turning rod, a horizontal intermediate wall to separate the salt chamber from the actuating disc;
   said flat gear having a shaft bored with a rod hole;
   said turning rod fits within said shaft of said flat gear;

said rotatable cap moves said actuating disc when rotated in a clockwise manner, said at least one pawl then engages and rotates the flat gear which rotates said turning rod and said grinding wheel to grind peper;

said rotatable cap does not move said actuating disc when rotated in a counterclockwise manner, whereby said at least one pawl does not engage said teeth of said flat gear to rotate said turning rod and said grinding wheel.

8. The pepper grinder as claimed in claim 7, wherein said position cylinder includes two pawls.

* * * * *